US008316522B2

(12) United States Patent
Kasai (10) Patent No.: US 8,316,522 B2
(45) Date of Patent: Nov. 27, 2012

(54) METHOD FOR SUPPLYING SLIDERS (76) Inventor: Juichi Kasai, Tokyo (JP)

( * ) Notice: Subject to any disclaimer, the term of this patent is extended or adjusted under 35 U.S.C. 154(b) by 433 days.

(21) Appl. No.: 12/641,710

(22) Filed: Dec. 18, 2009

(65) Prior Publication Data

US 2010/0154180 A1  Jun. 24, 2010

(30) Foreign Application Priority Data

Dec. 22, 2008 (JP) ................................ 2008-326318

(51) Int. Cl.
*B29D 5/00* (2006.01)
*A41H 37/06* (2006.01)

(52) U.S. Cl. ............... 29/409; 29/766; 29/408; 29/33.2; 29/809

(58) Field of Classification Search ............... 29/409, 29/408, 766, 33.2, 809
See application file for complete search history.

(56) References Cited

U.S. PATENT DOCUMENTS

| 4,629,054 A | 12/1986 | Kondo |  |
|---|---|---|---|
| 6,138,436 A * | 10/2000 | Malin et al. | 53/133.4 |
| 6,178,722 B1 * | 1/2001 | McMahon | 53/412 |
| 6,292,986 B1 * | 9/2001 | Provan et al. | 24/415 |
| 6,317,969 B1 | 11/2001 | Funaya et al. |  |
| 6,418,605 B1 * | 7/2002 | Kettner | 29/408 |
| 6,666,626 B2 * | 12/2003 | McMahon et al. | 406/50 |
| 6,780,146 B2 * | 8/2004 | Thomas et al. | 493/213 |
| 6,796,015 B2 * | 9/2004 | Cortigiano, Sr. | 29/410 |
| 6,796,931 B2 * | 9/2004 | Cortigiano, Sr. | 493/213 |
| 6,811,528 B1 * | 11/2004 | Chen | 493/212 |
| 6,899,461 B2 | 5/2005 | Kasai |  |
| 6,904,656 B2 * | 6/2005 | McMahon et al. | 29/408 |
| 6,907,713 B2 * | 6/2005 | Thieman | 53/412 |
| 6,918,230 B2 * | 7/2005 | Thieman | 53/412 |
| 6,918,234 B2 * | 7/2005 | Thomas et al. | 53/450 |
| 6,973,704 B2 * | 12/2005 | Cortigiano, Sr. | 29/409 |
| 7,200,911 B2 * | 4/2007 | Thomas et al. | 29/408 |
| 7,228,608 B2 * | 6/2007 | Thomas et al. | 29/408 |
| 7,296,952 B2 * | 11/2007 | Cortigiano, Sr. | 406/195 |
| 7,383,675 B2 * | 6/2008 | Thieman | 53/412 |
| 7,506,488 B2 * | 3/2009 | Thomas et al. | 53/412 |
| 7,540,662 B2 * | 6/2009 | Thieman | 383/64 |
| 7,552,573 B2 * | 6/2009 | Thieman | 53/412 |
| 8,127,517 B2 * | 3/2012 | Thieman | 53/133.4 |
| 2005/0015956 A1 * | 1/2005 | Haws et al. | 29/409 |

(Continued)

FOREIGN PATENT DOCUMENTS

JP   61-63913 U   5/1986

(Continued)

*Primary Examiner* — Essama Omgba
(74) *Attorney, Agent, or Firm* — Rothwell, Figg, Ernst & Manbeck, P.C.

(57) ABSTRACT

A slider having an outer guide that closes a zipper by sliding movement of the slider and an inner guide that opens the zipper by the sliding movement and is formed revolvable on the outer guide. A method for supplying sliders provides sliders that are not entangled with each other and are not clogged when supplied with the inner guide revolved to the outside. The slider has a groove formed by the inner guide protruding upwards from the upper surface of a slider body. A flat guide plate disposed between a slider supplying machine and a slider assembling machine engages with the groove so that the upper surface directs in a vertical direction and, at the same time, side surfaces of adjacent sliders support the slider facing each other in a hanging down condition, and align and guide them in a line in a fixed direction.

22 Claims, 6 Drawing Sheets

U.S. PATENT DOCUMENTS

2007/0012717 A1 * 1/2007 Hanaoka et al. .............. 221/236

FOREIGN PATENT DOCUMENTS

| JP | 63-31810 U | 3/1988 |
| JP | 2000-270910 A | 10/2000 |
| JP | 2002058509 A | 2/2002 |
| JP | 2004-209841 A | 7/2004 |
| JP | 2004209841 A | 7/2004 |
| WO | 00/67602 A2 | 11/2000 |

* cited by examiner

_METHOD FOR SUPPLYING SLIDERS_

TECHNICAL FIELD TO WHICH THE INVENTION RELATES

The present invention relates to a method for supplying sliders into a slider assembling apparatus. More specifically, the present invention relates to a slider assembled in a plastic zipper. The slider is used for opening and closing the plastic zipper which is easily opened and re-closed while keeping hermetic sealing even after re-opening and re-closing procedures for multiple times, and which is used as packing materials for foods, medicines, electronic products and so on. The present invention relates to a method for supplying consecutively sliders, which are used for opening and closing the plastic zipper, to a slider assembling apparatus wherein each slider is assembled into each plastic zipper.

BACKGROUND ART

For such a slider as described above and as assembled into the plastic zipper, conventionally known is a slider which comprises an inner guide and an outer guide wherein the inner guide is inserted between male and female hooks of the plastic zipper so as to open the hooks upon sliding movement of the slider and wherein the outer guide sandwiches male and female hooks of the plastic zipper so as to close the hooks by sliding movement of the slider.

In patent document 1 (Japanese Patent Application Laid-open No. 58509/2002), the present inventor proposed an assembling method of the above-mentioned slider by which the slider is easily assembled into a plastic zipper at a high speed and is not fallen off from the plastic zipper formed even on a thin film having less strength.

In the slider assembling method proposed by the present inventor, the inner guide is disposed revolvable around an axis which is crossed at a right angle to the plastic zipper on the body of the slider. At first, the outer guide is expanded and located at a position where the outer guide sandwiches the plastic zipper, thereafter, the inner guide is revolved around the above-mentioned axis and is transferred to a predetermined position inside the outer guide, thus the slider is assembled into the plastic zipper.

Further, in patent document 2 (Japanese Patent Application Laid-open No. 209841/2004), the present inventor proposed a method for assembling a slider which has such a construction as described above effectively into a plastic zipper.

In the proposed method, the sliders are aligned by means of attachments disposed on the drum-type parts feeder so that the inner guides, disposed rotatably on the slider bodies, direct upwards. At the same time, the sliders are aligned in a line in a tangential direction from the track of the drum of the parts feeder so that the side surfaces of the sliders align in a longitudinal direction of the plastic zipper and they are fed to the slider supply way. Thereafter, pins are inserted into pick up holes formed on an end surface of the outer guide of the slider, i.e., a front surface of the slider when it is transferred into a direction wherein the plastic zipper is open, whereby the outer guide is expanded and is assembled into the plastic zipper.

However, in the above-mentioned slider, an end portion of the outer guide, which receives the rotated inner guide, i.e., an end portion opposite to the surface having the pick up holes formed thereon, is opened so as to receive the inner guide.

Accordingly, in the above-mentioned method wherein the side surfaces of the sliders are aligned in a longitudinal direction of the plastic zipper, when the sliders are fed out, if the sliders directing forwards and the sliders directing backwards are aligned consecutively on the slider supplying way, in the case that open ends of the outer guides of both the sliders face each other, they engage with each other. Then, the sliders are entangled with each other and the movement of the sliders may be disturbed. (Please refer to the paragraph [0008] in patent document 2.

As a result, there occurs a defect that a consecutive assembling operation of the sliders is disturbed.

Figure 5:
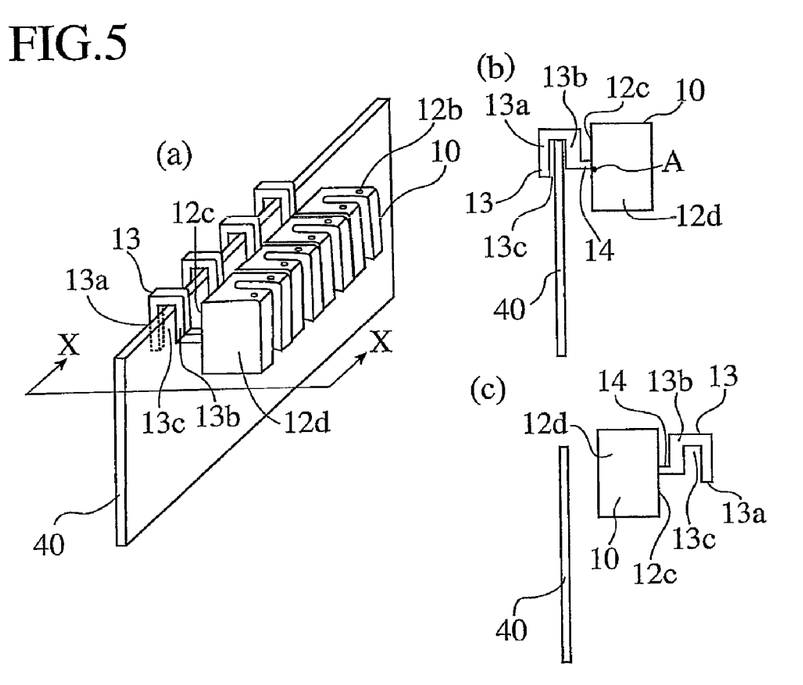
Figure 6:
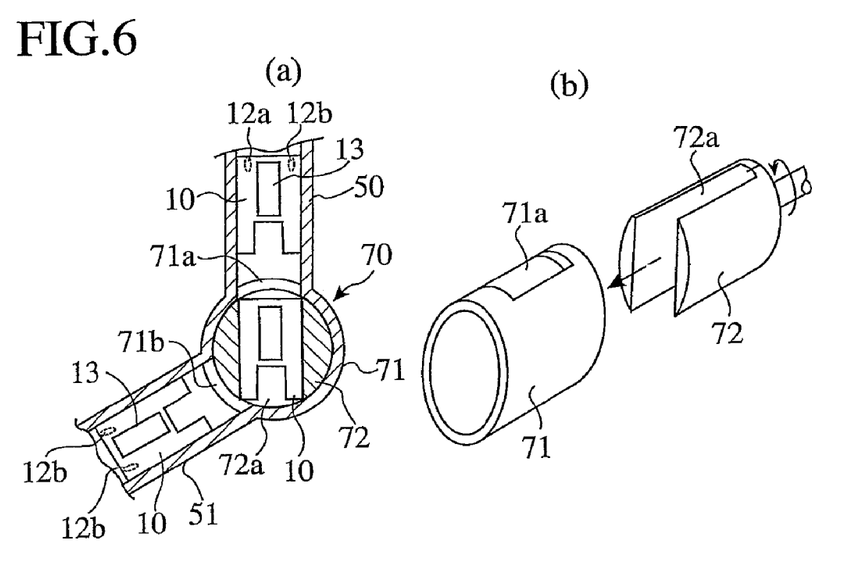

In order to obviate the defect, patent document 2 proposes a method for supplying sliders wherein as illustrated in FIGS. 5 and 6, a pair of rolls are disposed on the side of slider supplying way, and the sliders are fed out one by one while they are nipped by the pair of rolls. At the same time, the direction of the sliders is detected by a direction detector, and the direction of the slider is converted by a direction convertor so that the direction of the sliders are aligned in a fixed direction, if necessary.

Nevertheless in the slider supplying apparatus, even if the sliders are fed out one by one while they are nipped by the pair of rolls, there may cause clogging when the sliders directing forwards and the sliders directing backwards are aligned consecutively on the slider supplying way before they reach the direction detector or the direction convertor and they engage with each other. Thus, there is a defect that sliders cannot be assembled consecutively for a long time.

DISCLOSURE OF THE INVENTION

Objects of the Invention

It is an object of the present invention to provide a method for supplying sliders which overcomes the problems inherent to the above-described conventional methods and by which clogging of the sliders does not occur.

In order to accomplish this object, the present inventor has eagerly investigated. As a result, the present inventor has found out that the problems inherent to the above-described conventional methods are caused by the fact that the open end portions of the outer guides of both the sliders face each other in the method of patent document 2, since the side surfaces of the outer guide are aligned in a longitudinal direction of the plastic zipper.

Therefore, in the present invention, sliders supplied from a parts feeder are aligned in such a manner that two sides, each of which faces forwards and backwards, respectively, of the outer guide are aligned in an advancing direction. In this case, in all the sliders, each slider cannot be assembled into a zipper unless the direction of the inside guide protruding upwards from the upper surface of the slider body directs in a same desired direction.

However, according to the result of a practical experience, it was revealed that it is difficult for all the sliders to direct the direction of the inside guides protruding upwards from the upper surfaces of the slider bodies in a same desired direction by means of the attachments disposed on the drum-type parts feeder.

Accordingly, it is another object of the present invention to provide a method by which the direction of the inside guides protruding upwards from the upper surfaces of the slider bodies are directed in a same desired direction.

PROBLEMS TO BE SOLVED BY THE INVENTION

Means to Solve the Problems

According to the present invention, the above-described objects are achieved by a method for supplying sliders which are to be assembled in plastic zippers in order to open and close the plastic zippers, each of the zippers having a pair of male and female hooks formed on surfaces of plastic films, and each of which sliders comprises an outer guide, riding on the plastic zipper so as to constitute a slider body and serving to close the plastic zipper by means of sliding movement of the slider, and an inner guide, serving to close the plastic zipper by means of sliding movement of the slider, said inner guide is disposed on the slider body in such a manner that it protrudes outwards from the slider body and that it is revolvable around an axis which is crossed at a right angle to the plastic zipper, and when the sliders, which are capable of being arranged at a predetermined position where they function as inner guide, are supplied from a slider supplying machine to a slider assembling machine by means of the revolving motion, the sliders, which are being supplied, are provided with a groove extending in parallel with said axis and formed by the inner guides protruding upwards from the upper surfaces of the slider bodies, a flat guide plate, which is disposed between the slider supplying machine and the assembling machine, engages with said groove so that the upper surfaces direct in a vertical direction and that at the same time, the sliders hung down in a vertical direction are supported in a condition wherein side surfaces of the adjacent sliders are adjacent to each other in order to align and guide the sliders in a constant direction.

According to the present invention, said inner guide of said slider may comprise an inner guide member which serves to open the plastic zipper by means of the revolving motion and a member which will become the upper surface of the slider body, a dent portion which extends in parallel with said axis may be formed between the inner guide member and the member to be the upper surface, and said dent portion may become said groove in a condition wherein said inner guide reverses outwards from the upper surface of the slider body.

Further, according to the present invention, it is preferred that a trough which guides the sliders aligned and guided in a direction by said guide plate to a stopping member corresponding to said slider assembling machine and a pushing member which pushes the slider guided by said trough to said stopping member are disposed between said guide plate and said slider assembling machine, and a guide way of said pushing member is disposed in a y-shape relative to said trough.

In this case, it is preferred that an angle θ which is formed between said trough and said guide way is equal to or larger than 30 degree and which is equal to or smaller than 45 degree.

According to the present invention, it is preferred that said trough is provided with an outer trough which guides side surfaces of outer guide for said slider, an inside guide which guides inside of said outer guide, and a stopping member which stops the slider at a predetermined position.

Moreover, according to the present invention, it is preferred that pick-up holes are formed on an end surface of the outer guide, an end surface of said slider which stops at said stopping member directs in an advancing direction, and a slider mounting member of said slider assembling machine may be provided with pin members, which engage with pick-up holes of the slider stopped at said stopping member and which expand and contract said outer guide so that said slider is transferred from said trough to a position of said plastic zipper and is assembled.

In this case, it is preferred that a direction changer which changes a direction of said slider is disposed in said trough so that said pick-up holes formed on said slider is faced to the pin members of the slider mounting member of said slider assembling machine.

ADVANTAGES OF THE INVENTION

According to the present invention, the sliders are aligned and fed to the slider supplying way by means of the attachments disposed on the drum-type parts feeder in such a manner that each of two sides of the outer guides of the sliders, i.e., the slider bodies, are directed forwards and backwards, respectively, in an advancing direction.

Therefore, according to the present invention, the open ends of the outer guides orderly located do not face each other unlike those in patent document 2. Consequently, such a condition as that sliders facing forwards and backwards are mixed can be prevented. Thus, the problems inherent to the above-mentioned conventional technologies do not occur.

In this case, however, sliders cannot be assembled into plastic zippers, unless inner guides protruding upwards from slider bodies direct in the same desired direction in all the sliders.

Therefore, according to the present invention, each of the sliders, which are being supplied, is provided with a groove extending in parallel with the axis and formed by the inner guide protruding upwards from the upper surface of the slider body, and a flat guide plate, which is disposed between the slider supplying machine and the assembling machine, engages with the groove so that the upper surface directs in a vertical direction and that at the same time, the sliders hung down in a vertical direction are supported in a condition wherein side surfaces of the adjacent sliders are adjacent to each other in order to align and guide the sliders in a constant direction.

Consequently, in the slider which does not align in the same desired direction, its groove does not locate on the guide plate. Such a slider is not supported by the guide plate, is not guided along the guide plate, and is removed. Therefore, according to the present invention, entanglement or clogging of sliders which has been observed in conventional technologies does not occur.

As a result, according to the method for supplying sliders of the present invention, the assembling operations of sliders can be continued for a long time.

Furthermore, sliders can be assembled very effectively into plastic zippers by carrying out the method for supplying sliders of the present invention when it is done in the slider assembling apparatus proposed by the present inventor in patent document 2.

BRIEF DESCRIPTION OF THE DRAWINGS

The present invention will now be explained in detail referring to the attached drawings, wherein:

FIG. 1 illustrates an embodiment of a slider used in the present invention, wherein FIG. 1(*a*) is a perspective view wherein the inner guide is revolved to the outside of the slider body, FIG. 1(*b*) is a front view of the slider illustrated in FIG. 1(*a*), and FIG. 1(*c*) is a front view wherein the inner guide is revolved to the inside of the slider;

FIG. 5 illustrates a condition wherein sliders are supported in a hanging down state by a guide plate in an embodiment of the slider supplying apparatus illustrated in FIGS. 3 and 4; wherein FIG. 5(a) is a perspective view seen from the right side of FIGS. 3 and 4, and 5(b) is a view seen in a direction of X-X in FIG. 5(a), and FIG. 5(c) is a view diagrammatically illustrating a positional relationship between the reversed slider and the guide plate;

FIG. 6 illustrates a direction changer used in the embodiment of the slider assembling apparatus illustrated in FIGS. 3 and 4, wherein FIG. 6(a) is a cross sectioned front view, and FIG. 6(b) is an exploded perspective view;

BEST MODE FOR CARRYING OUT THE INVENTION

The present invention will now be explained in detail referring to the drawings.

Figure 1:
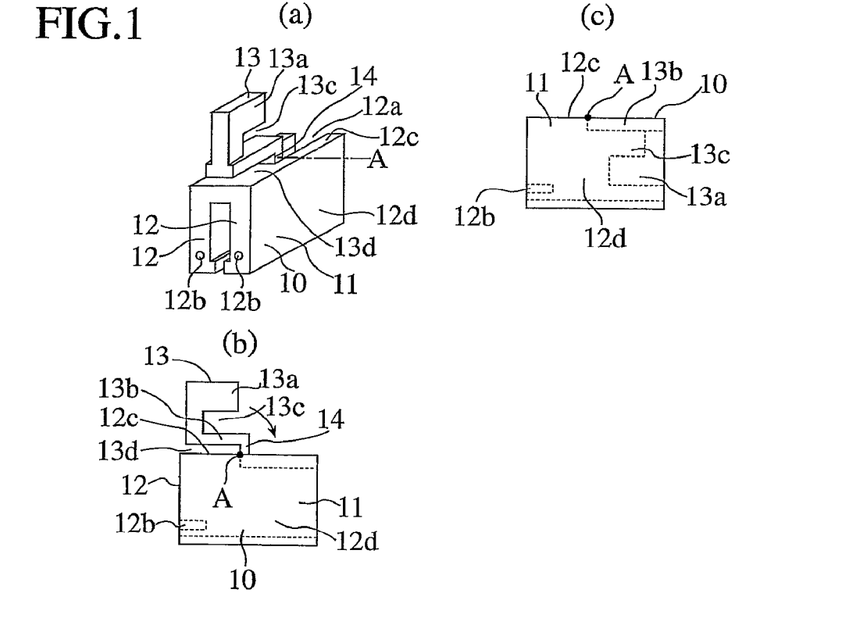
Figure 2:
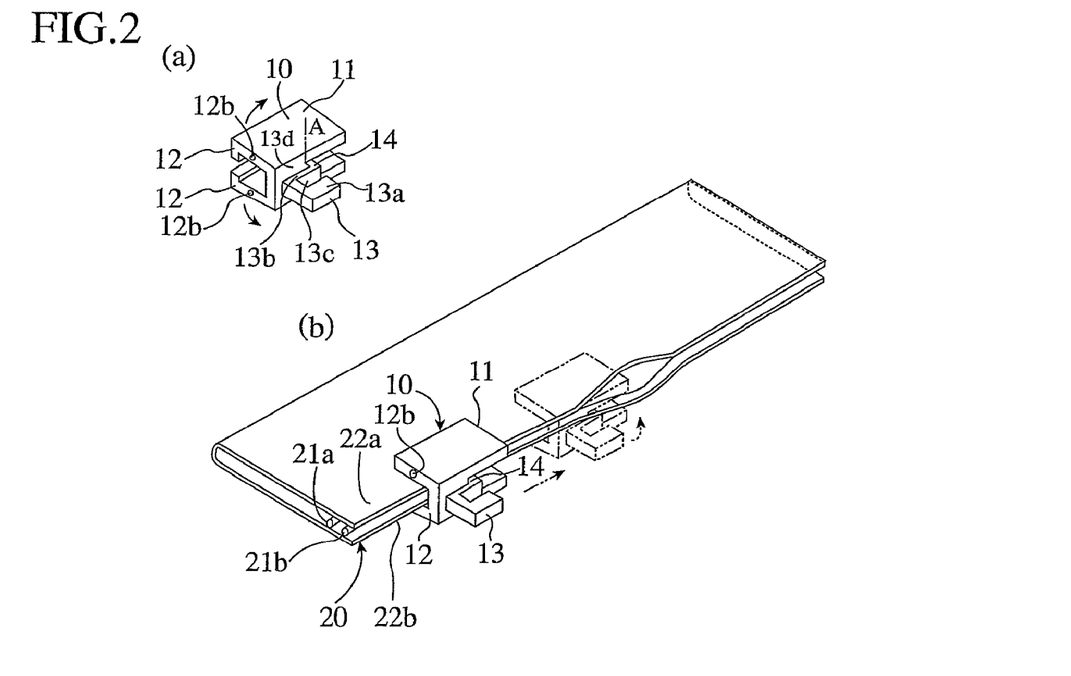
FIG. 2 is a perspective view which illustrates an action of the slider and its movement relative to the plastic zipper when the slider is assembled into the plastic zipper by means of the slider supplying apparatus according to the present invention, wherein FIG. 2(*a*) illustrates an action of the outer guide, and FIG. 2(*b*) illustrates a movement of the slider relative to the plastic zipper.

FIG. 1 illustrates an embodiment of a slider used in the present invention, wherein FIG. 1(a) is a perspective view wherein the inner guide is revolved to the outside of the slider body, FIG. 1(b) is a front view of the slider illustrated in FIG. 1(a), and FIG. 1(c) is a front view wherein the inner guide is revolved to the inside of the slider; and FIG. 2 is a perspective view which illustrates an action of the slider and its movement relative to the plastic zipper when the slider is assembled into the plastic zipper by means of the slider supplying apparatus according to the present invention, wherein FIG. 2(a) illustrates an action of the outer guide, and FIG. 2(b) illustrates a movement of the slider relative to the plastic zipper.

As illustrated in FIG. 2(b), a plastic zipper 20 comprises a pair of male and female hooks 21a and 21b formed on surfaces of plastic films 22a and 22b.

The slider 10 is used to open and close the plastic zipper 20, and it comprises an outer guide 12 and an inner guide 13 as illustrated in FIG. 1.

The outer guide 12 constitutes a slider body 11 which is formed substantially in a rectangular parallelepiped shape. It has a cross section of a reversed U-shape, when it is cross sectioned along a plane crossed at a right angle to a longitudinal direction of the plastic zipper 20. As illustrated in FIG. 2(b), the U-shaped cross sectional portion rides on the plastic zipper 20 and is assembled into it by expanding the lower portions of the outer guide 12 in a direction indicated by arrows (FIG. 2(a)). The outer guide 12 serves to close the plastic zipper 20 by sliding movement of the slider along the plastic zipper 20.

Meanwhile, the inner guide 13 is connected to the slider body 11 by means of a hinge 14 and is revolvable around an axis A crossed at a right angle to the plastic zipper 20 so that it takes a reversed condition, i.e., a condition revolved outsides which is illustrated in FIG. 1(b), and a revolved condition as illustrated in FIG. 1(c). The inner guide 13 serves to open the plastic zipper 20 in a condition illustrated in FIG. 1(c).

In FIG. 2(b), the slider 10 is assembled into the plastic zipper 20 at a position illustrated in a solid line, and it is moved to a position illustrated in an imaginary line, where the inner guide 13 is revolved around the axis A to a predetermined position.

In the present embodiment, the inner guide 13 comprises an inner guide member 13a, which serves to open the plastic zipper 20 in a revolved condition illustrated in FIG. 1(c), and member 13b which forms an upper surface of the slider body. A dent portion 13c extending in parallel with the axis A between both the members 13a and 13b is formed. As will be explained later referring to FIGS. 3 and 4, the dent portion 13c serves as a groove which engages with a guide plate 40.

As illustrated in FIG. 1(a), an end portion 12a of the outer guide 12 has a cutout formed therein for receiving the inner guide 13 which is revolved around the axis A. On the other hand, an end surface of the outer guide 12 opposite to the side of the end portion 12a has pick up holes 12b formed therein, and as will be explained later referring to FIG. 8, pin members 85a of a slider mounting device 85 in a slider assembling apparatus 90 engages with the pick up holes 12b.

Sliders 10 are supplied with the plastic zippers 20, and as illustrated in FIG. 1(c), the inner guides 13 are revolved around the axis A and are positioned at a predetermined position where they fulfill their function as the inner guide 13, and they are assembled.

Then, one embodiment of the method for supplying sliders 10 according to the present invention will now be explained with reference to FIG. 3.

Figure 3:
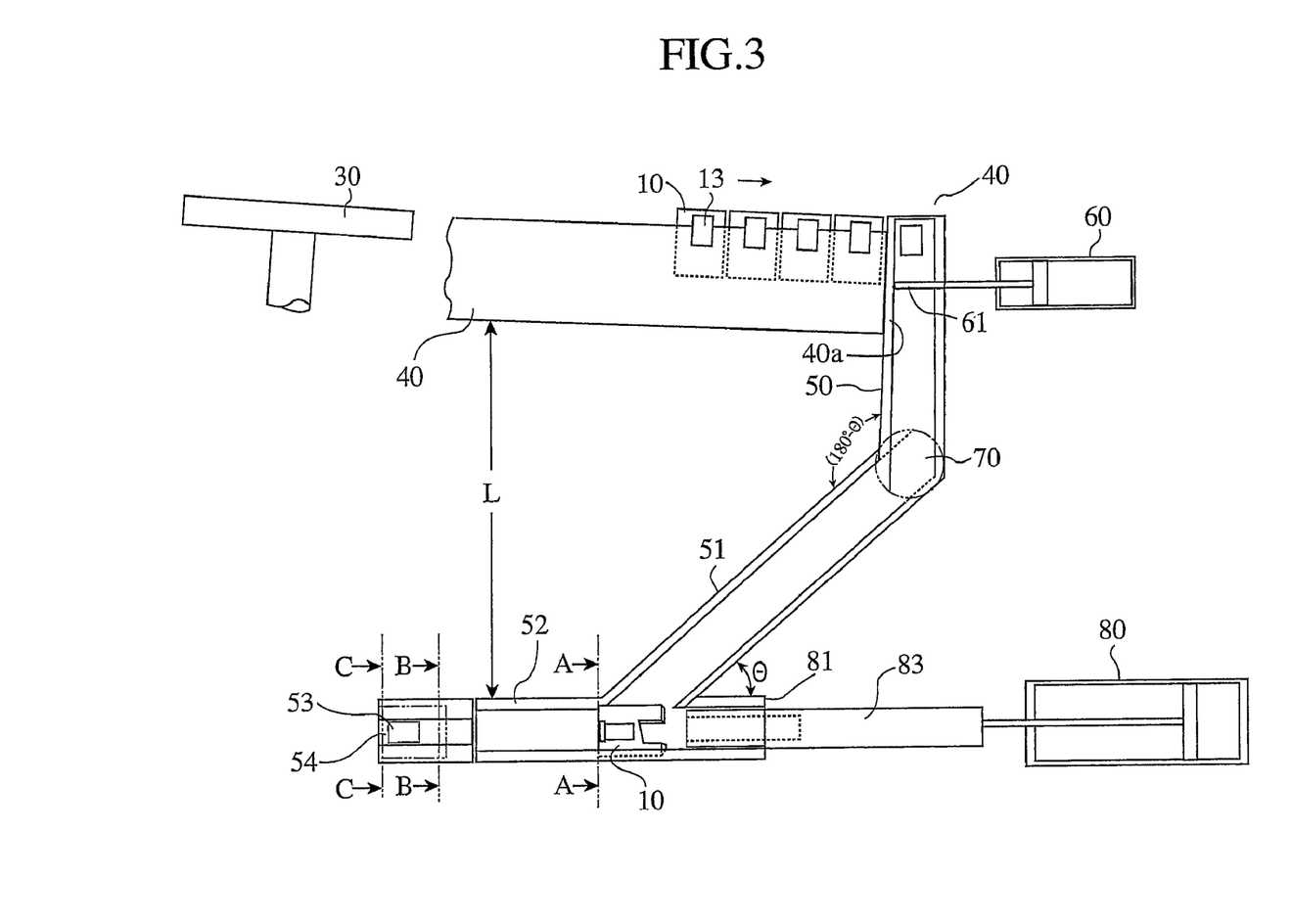
FIG. 3 is a front view of essential portions carrying out the method for supplying the sliders according to the present invention.
Figure 8:
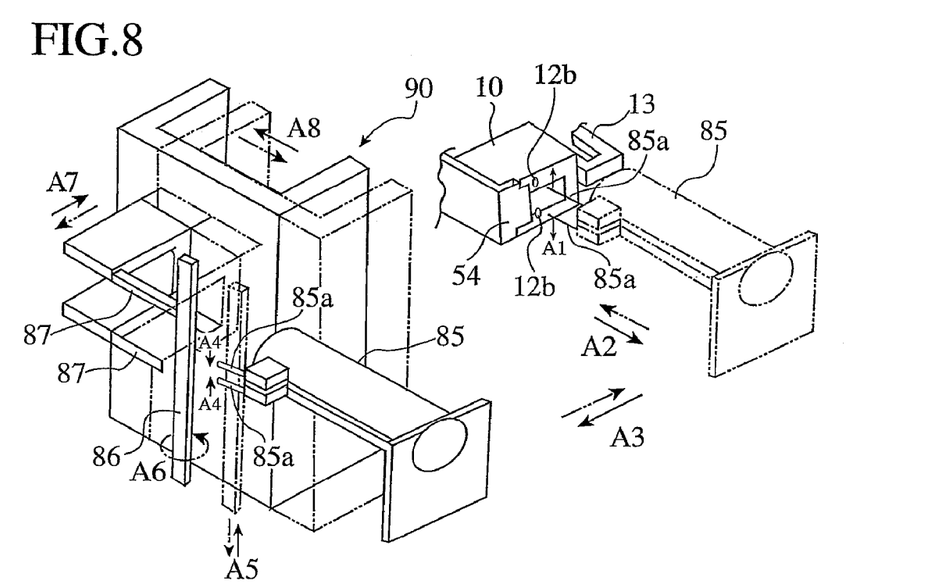
FIG. 8 is a perspective view which illustrates actions of an assembling member of the slider assembling apparatus used in the embodiment of the slider supplying apparatus illustrated in FIGS. 3 and 4 and which is seen from the left side of FIGS. 3 and 4.
Figure 9:
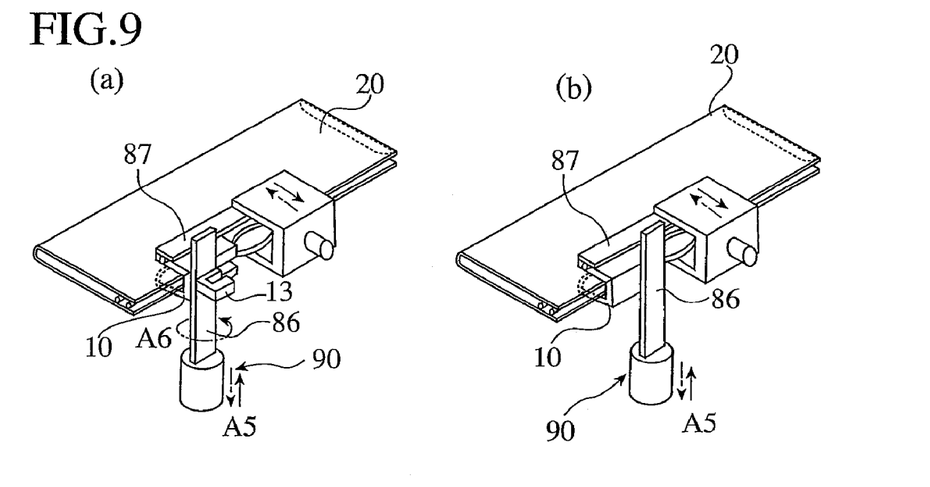
FIG. 9 is a perspective view which illustrates a condition wherein a slider is assembled into a plastic zipper in the embodiment of the slider supplying apparatus illustrated in FIGS. 3 and 4, wherein the inner guide is revolved to the outside of the slider body in FIG. 9(a), and the inner guide is revolved to the inside of the slider body in FIG. 9(b).

According to the present invention, the sliders 10 which are supplied from such a slider supplying apparatus 30 as illustrated in FIG. 3 are assembled into the plastic zippers 20 by such a slider assembling apparatus 90 as illustrated in FIGS. 8 and 9.

A conventionally known drum type parts feeder may be used as the slider supplying apparatus 30. In the present embodiment, a vibrating type supplying apparatus, for example, EA-25 type parts feeder manufactured by Shinko Denki Ltd. was used for the slider supplying apparatus 30.

In the drum type parts feeder 30, the sliders 10 are transferred along the track disposed in the inside of the drum, and they are aligned by means of attachments (not shown) during this transfer in such a manner that almost flat sides 12d of the outer guides 12 (i.e., the slider bodies 11) of the sliders 10 direct forwards and backwards, respectively (i.e., they are located in front and back positions, respectively).

In this case, because sliders 10 aligned in a certain direction on the guide plate 40 are in touch with each other at their almost flat sides 12d, they are not entangled and their transfer on the trays can be done smoothly. Namely, the open end portions 12a of the outer guides 12 do not face each other, and mixture of sliders facing forwards and those facing backwards can be prevented from occurring. Thus, the problems accompanying to the conventional technologies do not arise.

In this case, however, as mentioned above, unless, the direction of the inner guides 13 protruding upwards from the upper surfaces 13 of the slider bodies 11 directs in the same desired direction in all the sliders 10, the sliders 10 cannot be assembled into the plastic zippers 20.

Moreover, as a result of a practical experimental test, it was revealed that it is difficult for all the sliders 10 to direct the direction of the inner guides 13 protruding upwards from the upper surfaces 13 of the slider bodies 11 in the same desired direction only by means of the attachments disposed on the drum type parts feeder 30.

Thereafter, in the present invention, it is paid attention to a groove 13c which is formed in the slider 10 upon its supply by means of the inner guide 13 protruding upwards from the upper surface 12c of the slider body 11 and which extends in parallel with the axis A of the slider 10.

Figure 4:
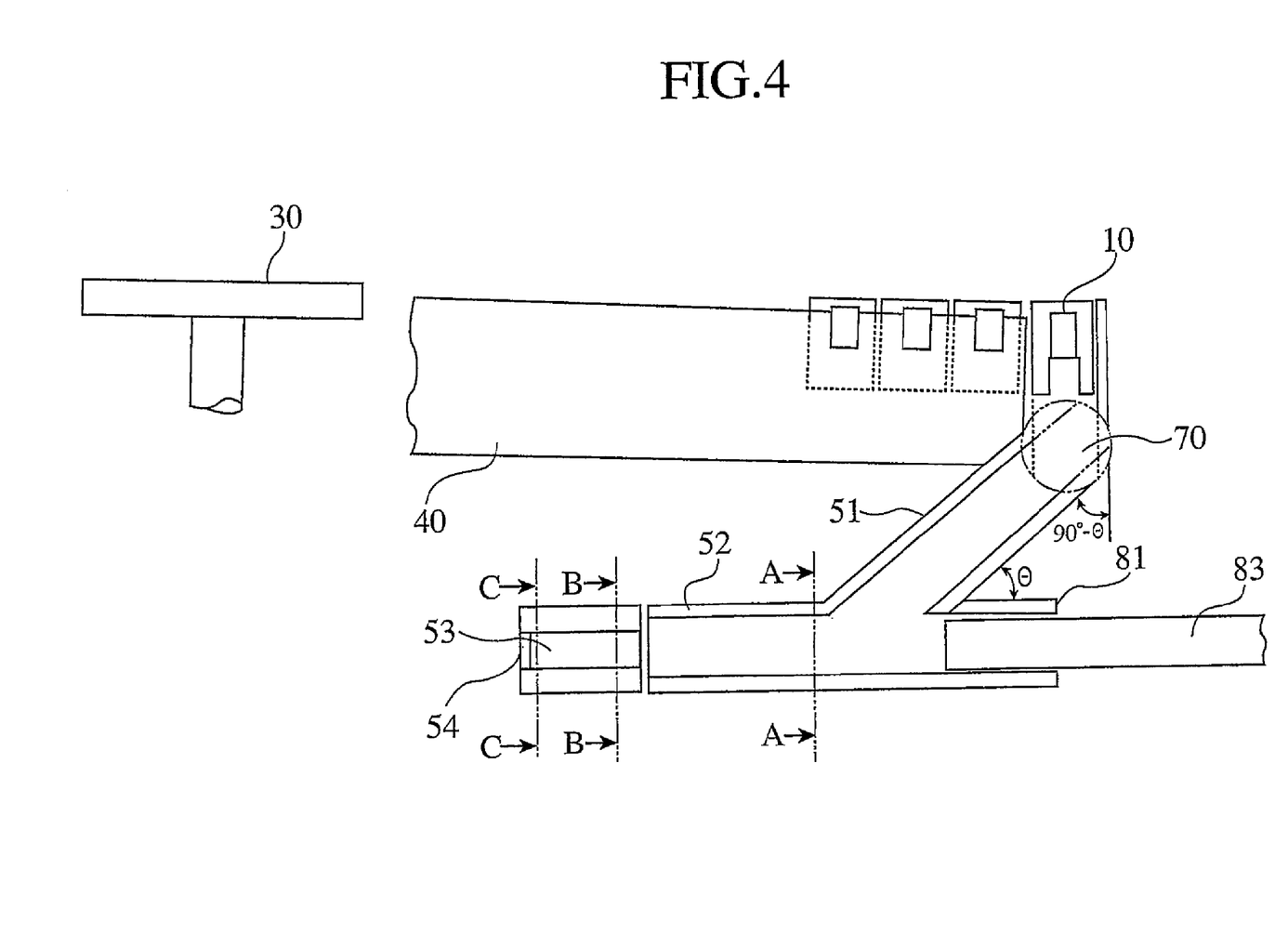
FIG. 4 is a front view of essential portions of another embodiment carrying out the method for supplying the sliders according to the present invention.

Explanation will now be done referring to FIG. 5. FIG. 5 illustrates a condition wherein sliders are supported in a hanging down state by a guide plate in an embodiment of the slider supplying apparatus illustrated in FIGS. 3 and 4; wherein FIG. 5(a) is a perspective view seen from the right side of FIGS. 3 and 4, and 5(b) is a view seen in a direction of X-X in FIG. 5(a), and FIG. 5(c) is a view diagrammatically illustrating a positional relationship between the reversed slider and the guide plate.

A flat guide-plate 40 is disposed in the tangential direction relative to the circular surface of the drum of the slider supplying apparatus 30 at a position between the slider supplying apparatus 30 and a slider assembling apparatus. (See FIGS. 8 and 9.)

The groove 13c of the slider 10 is engaged with the flat guide plate 40, the slider 10 is supported in a hanging down state and is aligned and guided in a fixed direction under a condition wherein the upper surface 12c directs in a vertical direction (see FIGS. 5(a) and 5(b)).

Consequently, the slider which is not aligned in a desired fixed direction (i.e., the inner guide of which faces an opposite direction), the groove 13c does not position on the guide plate 40 as illustrated in FIG. 5(c). Such a slider 10, which is not supported by the guide plate 40, is removed from the slider supplying way, and is not guided along the guide plate 40. Therefore, according to the present invention, entanglement of sliders does not occur, and accordingly, clogging of sliders does not occur.

According to the method for supplying the sliders of the present invention, therefore, assembling operation of sliders can be continued smoothly for a long time.

Then, the method for transferring sliders from the guide plate 40 to the slider assembling apparatus 90 will be explained with reference to FIG. 3. FIG. 3 is a front view of essential portions carrying out the method for supplying the sliders according to the present invention.

As illustrated in FIG. 3, a right end portion 40a of the guide plate 40 extends to a position near the first outer trough 50 extending vertically. The first outer trough 50 guides the slider 10 which is aligned and guided in a fixed direction by means of the guide plate 40 to the stopping member 54 corresponding to the slider assembling apparatus 90 (see FIGS. 8 and 9).

A gate 61 is disposed on an upper tip portion of the first outer trough 50 extending vertically, and the gate 61 is reciprocated in a horizontal direction by means of a gate reciprocating member 60, which may be a fluid pressure cylinder, such as an air cylinder or a hydraulic cylinder, or an electromagnetic solenoid, so that it separates sliders 10, which have been guided along the guide plate 40, one by one and supplies them to the first outer trough 50 extending vertically.

In this embodiment, the pick up holes 12b of the slider 10 which is separated by the gate 61 and which exists in the first outer trough 50 direct upwards (see FIG. 5(a)).

On the other hand, as will become clear from the later explanation with reference to FIG. 8, the pick up holes 12b of the slider 10 are required to face to the stopping member 54 when the slider 10 has arrived at the stopping member 54 in this embodiment.

For this purpose, the slider 10, which is in the first outer trough 50 and its pick up holes direct upwards (i.e., in a a direction which is reverse to the advancing direction), is rotated in an anti-clockwise direction one by one by an angle of (180°−θ) degrees by means of the direction changer 70 so that the pick up holes 12b direct in an advancing direction, and the slider 10 is supplied with the outer trough 51.

The direction changer 70 will be explained referring to FIG. 6. FIG. 6 illustrates a direction changer used in the embodiment of the slider assembling apparatus illustrated in FIGS. 3 and 4, wherein FIG. 6(a) is a cross sectioned front view, and FIG. 6(b) is an exploded perspective view.

The first outer trough 50 extending vertically is connected to a second outer trough 51 through the direction changer 70, which trough 51 is inclined downwards. The direction changer 70 comprises a fixed cylinder body 71 of a hollow cylindrical shape and a circular column body 72 which is sustained rotatablly inside the fixed cylinder body 71. As illustrated in FIG. 6(a), the fixed cylinder body 71 has a hole 71a, connected to the first outer trough 50 and extending in a radial direction, and a hole 71b, connected to the second outer trough 51 and extending in radius direction, formed therein. As illustrated in FIG. 6(b), the circular column body 72 has a dent portion 72a, accommodating sliders 10 supplied from the first outer trough 50, formed therein. The circular column body 72 is connected to a suitable rotary driving source (not shown) such as an electric motor or a rotary actuator, and by rotating the circular column body 72 for a predetermined angle, the dent portion 72a takes a condition, wherein the dent portion 72a is connected to the first outer trough 50 through the hole 71a extending radially, and the other condition, wherein it is connected to the second outer trough 51 through the hole 71b extending radially.

The second outer trough 51 which is inclined downwards is connected to a horizontal third outer trough 52 and a guide way 81 for the pushing member 80. The second outer trough 51 has an angle θ relative to the horizontal guide way 81 for the slider 10, and the second outer trough 51, the third outer trough 52 and the guide way 81 are disposed in a y-shape.

The pushing member 80 is reciprocated horizontally by a fluid pressure cylinder, such as an air cylinder or a hydraulic cylinder, or an electromagnetic solenoid and pushes the slider 10, which has been guided from the second outer trough 51 to the third outer trough 52, to the stopping member 54.

Figure 7:
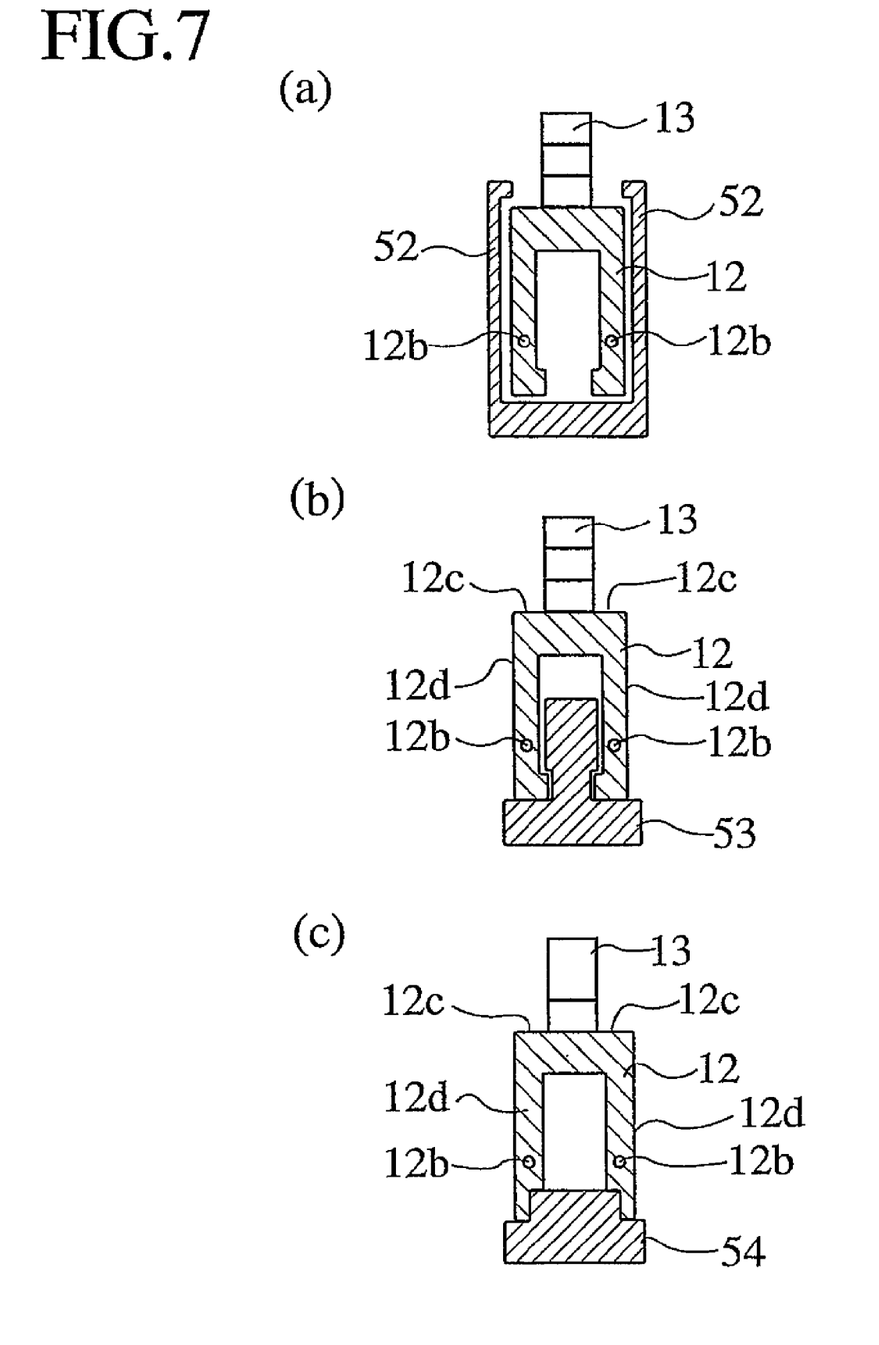
FIG. 7(a) is a cross sectional view taken along line A-A in FIGS. 3 and 4.
FIG. 7(b) is a cross sectional view taken along line B-B in FIGS. 3 and 4.
FIG. 7(c) is a cross sectional view taken along line C-C in FIGS. 3 and 4.

The structure of the third outer trough 52 will now be explained referring to FIG. 7. FIG. 7(a) is a cross sectional view taken along line A-A in FIGS. 3 and 4, FIG. 7(b) is a cross sectional view taken along line B-B in FIGS. 1 and 4, and FIG. 7(c) is a cross sectional view taken along line C-C in FIGS. 3 and 4.

In order to direct two pick up holes 12b of the slider 10 in a direction of the stopping member 54 and to position it vertically, the third outer trough 52, having such a cross section as illustrated in FIG. 7(a), and an inside guide 53, connected to the third outer trough 52 and having such a cross section as illustrated in FIG. 7(b), are disposed.

The sliders 10, supplied one by one from the gate 61 and the direction changer 70, are regulated from the outside by the third outer trough 52, and then they are regulated from the inside by the inside guide 53.

The pushing member 80 comprises a fluid pressure cylinder, such as an air cylinder or a hydraulic cylinder, and reciprocates horizontally. A pushing member 80 has a stick shaped pushing portion 83 formed at the tip portion thereof which can pass through the third outer trough 52 and the inside guide 53, and it can stop the sliders 10 at a predetermined position on the inside guide 53. Thus, the sliders 10 which have been supplied one by one as described above can be stopped at the location of the stopping member 54 as illustrated in FIG. 7(c).

According to the present invention, because the sliders 10 are handled one by one, clogging of sliders 10 caused by their entanglement can be avoided.

In this case, it is preferred that the angle θ formed between the second outer guide 51 and the gate way 81 for the pushing member is equal to or larger than 30 degree and is equal to or smaller than 45 degree. If the angle θ is less than 30 degree, a falling speed of the sliders 10 becomes too low and the sliders 10 may stop on the way of the tray. On the other hand, if the angle θ exceeds 45 degree, the sliders 10 may topple down at the connecting portion between the second outer trough 51 and the gate way 81 for the pushing member, and there causes a condition wherein the pick up holes 12b direct downwards, and such troubles that the sliders 10 cannot be pushed by the pushing member 83 occur easily.

Further when the vertical distance L between the guide plate 40 and the third horizontal outer trough 52 cannot be long enough because of the layout, the direction changer 70 may be used for the gate 61 as illustrated in FIG. 4. Also in this case, the rotational angle of the gate 61 is set at (180°−θ) degrees in an anti-clockwise direction.

In the foregoing embodiment, the inner guide 13 comprises an inner guide member 13a which serves to open the plastic zipper 20 by revolving motion and the member 13b which becomes an upper surface of the slider body 11, and a dent portion 13c extending in parallel with the axis A is formed between both the members 13a and 13b, and thus, the dent portion 13c has been used as a groove under a condition wherein the inner guide 13 is reversed outwards from the upper surface of the slider body 11.

Further, according to the present invention, the inner guide 13 and the outer guide 12, i.e., the slider body 11, of the slider 10 are connected to each other by means of a hinge 14, and in a condition wherein the inner guide 13 is reversed outwards from the upper surface of the slider body 11, the dent portion 13d extending in parallel with the axis A is formed between the member 13b which will become the upper surface and the upper surface 12c of the upper guide 12, and the dent portion 13d may be used as the groove.

In this case, while the pick up holes 12b direct downwards, the slider 10 is supported by the guide plate 40 and is transferred. Therefore, the rotating angle of the gate 61 can be −θ, namely, the gate 61 is rotated by an angle θ in a reverse direction (i.e., in a clockwise direction) opposite to that in the previous embodiment.

Then, a procedure for assembling the slider 10, which has been stopped at the position of the stopping member 54, into the plastic zipper 20 will be explained referring to FIGS. 8 and 9.

Please note that FIG. 8 is a perspective view which illustrates actions of an assembling member of the slider assembling apparatus used in the embodiment of the slider supplying apparatus illustrated in FIGS. 3 and 4 and which is seen from the left sides of FIGS. 3 and 4.

FIG. 9 is a perspective view which illustrates a condition wherein a slider is assembled into a plastic zipper in the embodiment of the slider supplying apparatus illustrated in FIGS. 3 and 4, wherein the inner guide is revolved to the outside of the slider body in FIG. 9(a), and the inner guide is revolved to the inside of the slider body in FIG. 9(b).

As illustrated in FIG. 8, the slider 10 is stopped by the stopping member 54. Pin members 85a of the slider mounting device 85, which is located at a position illustrated by a double dot and a line (an imaginary line), is inserted into the pick up holes 12b formed in the outer guide 12 of the slider 10. The pin members 85a of the slider mounting device 85 are expanded in such directions as illustrated by the arrows A1 so as to open the outer guide 12. As a result, the slider 10 is brought into a condition wherein it can be removed from the stopping member 54.

Then, the slider mounting device 85 is transferred in an axial direction, i.e., in a direction indicated by the arrow A2, and the slider 10 is removed in a direction indicated by the arrow A2, while the outer guide is expanded.

Subsequently, the slider 10 is transferred in a direction indicated by the arrow A3 together with the slider mounting device 85 (the slider mounting device 85 which has been transferred is indicated by a solid line in FIG. 8), and the slider 10 is transferred to a position at the closed portion of the plastic zipper 20 (although it is not illustrated in FIG. 8, it is disposed in parallel with the axis, indicated by the solid line, of the slider mounting device 85).

The pin members 85a are closed at the closed portion of the plastic zipper 20 in a direction indicated by the arrow A4 (i.e., in a reverse direction to A1), and at the same time, the jig 86 formed in a flat-bar shape is moved in a direction indicated by the arrow A5 so that the jig 86 (the jig 86 has been located at a position illustrated in virtual line in FIG. 8) is inserted into a space 13d of square bracket shape which space is formed between the inner guide 13 and the outer guide 12 (see FIGS. 1(a) and 1(b)), and they take such a condition as illustrated in FIG. 9. FIG. 9 is a perspective view of the plastic zipper 20 and the jig 86 seen in a direction indicated by the arrow A3 in FIG. 8.

Subsequently, the fixing plate 87 is transferred in a direction indicated by the arrow A7, and in a condition wherein the slider 10 is fixed by means of the fixing plate 87 and the jig 86, a rack which has the fixing plate 87 and the jig 86 disposed thereon is transferred in a direction indicated by the arrow A8. (They take a state indicated by a solid line in FIG. 8.) As a result, as illustrated in FIG. 9(a), the slider 10 is fixed at a slider assembling position where both the closed portion and the open portion of the plastic zipper 20 exist.

Thereafter, as illustrated in FIG. 9(a), the jig 86 is rotated by 180 degrees in a direction indicated by the arrow A6 (anti-clockwise direction), and as illustrated in FIG. 9(b), the slider 10 is assembled by disposing the inner guide 13 at a predetermined position of the slider 10. Subsequently, the installation of the slider 10 is completed by unfastening the fixing plate 87 in a direction indicated by a dotted line of the arrow A7 (see FIG. 8(a)).

Thereafter, the members return to their original positions by the transfers in a direction indicated by a dotted line of the arrow A8 and in a direction indicated by a dotted line of the arrow A5, Simultaneous with the above-described transfer, transfers in a direction indicated by a dotted line of the arrow A3 and in a direction indicated by a dotted line of the arrow A2 are taken place.

More specifically, a group of the transfers from the arrows A1 to A4 indicated by the solid lines/and indicated by the dotted lines, and a group of the transfers from the arrows A5 to A8 indicated by the solid lines/and indicated by the dotted lines can be done independently except for exchange of the slider between both the groups. When the procedures including that for bag manufacturing are consecutively performed, steps which need to stop transfer of film in the bag manufacturing machine are those in the directions from the arrow A5 to A8 indicated by the solid lines (the transfers in the directions indicated by the arrows A4 and A5 are done together with those indicated by the solid lines).

According to the supplying method of the present invention, because the clogging in the supplying path of the sliders does not arise, there is an advantage that the supplying capacity of more than 60 pieces per minute can be ensured.

EXPLANATION OF REFERENCE NUMERALS 10 slider
11 slider body
12 outer guide
12a end portion
12b pick-up hole
12c upper surface of slider
13 inner guide
13a inner guide member
13b member forming an upper surface of a slider body
13c dent portion
13d another dent portion
14 hinge
20 plastic zipper
21a, 21b hook
22a, 22b plastic film
30 slider supplying machine (vibrating type supplying machine)
40 guide plate
50 first outer trough
51 second outer trough
52 third outer trough
53 inside guide
54 stopping member
61 gate
70 direction changer
71 fixed cylinder body
71a, 71b hole extending in a radius direction
72 circular column body
72a hollow portion for receiving slider
80 pushing member
83 pushing portion
85 slider mounting device
86 flat bar shaped jig
87 fixing plate
90 slider assembling machine
A revolving axis crossed at a right angle to plastic zipper
L vertical distance between guide plate and outer trough
θ angle between second outer trough and guide way of pushing member

What is claimed is:

1. A method for supplying sliders to be assembled in plastic zippers in order to open and close the plastic zippers, each of the zippers having a pair of male and female hooks formed on surfaces of plastic films, and each of which sliders comprises an outer guide, riding on the plastic zipper so as to constitute a slider body and serving to close the plastic zipper by means of sliding movement of the slider, and an inner guide, serving to close the plastic zipper by means of sliding movement of the slider, said inner guide is disposed on the slider body in such a manner that it protrudes outwards from the slider body and that it is revolvable around an axis which is crossed at a right angle to the plastic zipper, the method comprising:

supplying the sliders from a slider supplying machine, the sliders having a groove extending in parallel with said axis and formed by the inner guides protruding upwards from upper surfaces of the slider bodies, engaging said groove of the supplied sliders with a flat guide plate, which is disposed between the slider supplying machine and an assembling machine, such that the upper surfaces direct in a vertical direction and, at the same time, the sliders hang down in a vertical direction and are supported by the flat guide plate in a condition wherein side surfaces of adjacent sliders are adjacent to each other in order to align and guide the sliders in a constant direction.

2. The method for supplying sliders of claim 1, wherein said inner guide of said slider comprises:

an inner guide member that serves to open the plastic zipper;
a member that will become the upper surface of the slider body;
a dent portion that extends in parallel with said axis and is formed between the inner guide member and the member to be the upper surface, wherein said dent portion becomes said groove in a condition wherein said inner guide rotates outwards from the upper surface of the slider body.

3. The method for supplying sliders of claim 2, wherein said inner guide and said outer guide of said slider are connected to each other by a hinge, and when the inner guide is rotated outwards from the upper surface of the slider body, the dent portion, which extends in parallel with said axis and is formed between said inner guide and said outer guide, serves as said groove.

4. The method for supplying sliders of claim 1, further comprising:

guiding, via a trough, the sliders, which are aligned and guided in a direction by said guide plate, from said guide plate to a stopping member corresponding to said slider assembling machine; and
pushing, via a pushing member, a slider, which has been guided by said trough, to said stopping member;
wherein the trough and the pushing member are disposed between said guide plate and said slider assembling machine, and a guide way of said pushing member is disposed in a y-shape relative to said trough.

5. The method for supplying sliders of claim 4, wherein said guide way of sliders with comprises:

an outer trough that guides side surfaces of the outer guide of said slider,
an inside guide that guides inside of said outer guide, and
the stopping member which stops the slider at a predetermined position.

6. The method for supplying sliders of claim 5, wherein an angle θ, which is formed between said trough and said guide way, is equal to or larger than 30 degree and is equal to or smaller than 45 degree.

7. The method for supplying sliders of claim 4, wherein pick-up holes are formed on an end surface of the outer guide, an end surface of said slider that stops at said stopping member directs in an advancing direction, and a slider mounting member of said slider assembling machine is provided with pin members, which engage with pick-up holes of the slider stopped at said stopping member and which expand and contract said outer guide so that said slider is transferred from said trough to a position of said plastic zipper and is assembled.

8. The method for supplying sliders of claim 7, further comprising changing the direction of said slider via a direction changer disposed in said trough so that said pick-up holes formed on said slider are faced to the pin members of the slider mounting member of said slider assembling machine.

9. The method for supplying sliders of claim 8, wherein an angle θ, which is formed between said trough and said guide way, is equal to or larger than 30 degree and is equal to or smaller than 45 degree.

10. The method for supplying sliders of claim 4, wherein an angle θ, which is formed between said trough and said guide way, is equal to or larger than 30 degree and is equal to or smaller than 45 degree.

11. The method for supplying sliders of claim 7, wherein an angle θ, which is formed between said trough and said guide way, is equal to or larger than 30 degree and is equal to or smaller than 45 degree.

12. A system for supplying sliders to be assembled in plastic zippers in order to open and close the plastic zippers, each of the zippers having a pair of male and female hooks formed on surfaces of plastic films, and each of which sliders comprises an outer guide, riding on the plastic zipper so as to constitute a slider body and serving to close the plastic zipper by means of sliding movement of the slider, and an inner guide, serving to close the plastic zipper by means of sliding movement of the slider, said inner guide is disposed on the slider body in such a manner that it protrudes outwards from the slider body and that it is rotatable around an axis which is crossed at a right angle to the plastic zipper, the system comprising:
   a slider supplying machine configured to supply the sliders, the sliders having a groove extending in parallel with said axis and formed by the inner guides protruding upwards from upper surfaces of the slider bodies;
   a flat guide plate configured to engage said groove of the supplied sliders such that the upper surfaces direct in a vertical direction and, at the same time, the sliders hang down in a vertical direction and are supported by the flat guide plate in a condition wherein side surfaces of adjacent sliders are adjacent to each other in order to align and guide the sliders in a constant direction; and
   an assembling machine;
   wherein the flat guide plate is disposed between the between the slider supplying machine and the assembling machine.

13. The system for supplying sliders of claim 12, wherein said inner guide of said slider comprises:
   an inner guide member that serves to open the plastic zipper;
   a member that will become the upper surface of the slider body;
   a dent portion that extends in parallel with said axis and is formed between the inner guide member and the member to be the upper surface, wherein said dent portion becomes said groove in a condition wherein said inner guide rotates outwards from the upper surface of the slider body.

14. The system for supplying sliders of claim 13, wherein said inner guide and said outer guide of said slider are connected to each other by a hinge, and, when the inner guide is rotated outwards from the upper surface of the slider body, the dent portion, which extends in parallel with said axis and is formed between said inner guide and said outer guide, serves as said groove.

15. The system for supplying sliders of claim 12, further comprising:
   a trough configured to guide the sliders, which are aligned and guided in a direction by said guide plate, from said guide plate to a stopping member corresponding to said slider assembling machine; and
   a pushing member configured to push a slider, which has been guided by said trough, to said stopping member;
   wherein the trough and the pushing member are disposed between said guide plate and said slider assembling machine, and a guide way of said pushing member is disposed in a y-shape relative to said trough.

16. The system for supplying sliders of claim 15, wherein said guide way of sliders comprises:
   an outer trough that guides side surfaces of the outer guide of said slider,
   an inside guide that guides inside of said outer guide, and
   the stopping member which stops the slider at a predetermined position.

17. The system for supplying sliders of claim 16, wherein an angle θ, which is formed between said trough and said guide way, is equal to or larger than 30 degree and is equal to or smaller than 45 degree.

18. The system for supplying sliders of claim 15, wherein pick-up holes are formed on an end surface of the outer guide, an end surface of said slider that stops at said stopping member directs in an advancing direction, and a slider mounting member of said slider assembling machine is provided with pin members, which engage with pick-up holes of the slider stopped at said stopping member and which expand and contract said outer guide so that said slider is transferred from said trough to a position of said plastic zipper and is assembled.

19. The system for supplying sliders of claim 18, further comprising a direction changer disposed in said trough and configured to change the direction of said slider so that said pick-up holes formed on said slider are faced to the pin members of the slider mounting member of said slider assembling machine.

20. The system for supplying sliders of claim 19, wherein an angle θ, which is formed between said trough and said guide way, is equal to or larger than 30 degree and is equal to or smaller than 45 degree.

21. The system for supplying sliders of claim 18, wherein an angle θ, which is formed between said trough and said guide way, is equal to or larger than 30 degree and is equal to or smaller than 45 degree.

22. The system for supplying sliders of claim 15, wherein an angle θ, which is formed between said trough and said guide way, is equal to or larger than 30 degree and is equal to or smaller than 45 degree.

* * * * *